United States Patent
Langis

(10) Patent No.: US 6,742,432 B1
(45) Date of Patent: *Jun. 1, 2004

(54) BALUSTER-CUTTER FRAME ARRANGEMENT

(76) Inventor: Steven J. Langis, 33 Tremont St., Peabody, MA (US) 01960

( * ) Notice: Subject to any disclaimer, the term of this patent is extended or adjusted under 35 U.S.C. 154(b) by 0 days.

This patent is subject to a terminal disclaimer.

(21) Appl. No.: 09/655,691

(22) Filed: Sep. 6, 2000

(51) Int. Cl.[7] .................................................. B26D 7/02
(52) U.S. Cl. ........................ 83/745; 83/466.1; 83/468.7; 83/449; 269/111; 269/318
(58) Field of Search ................................ 269/111, 113, 269/114, 164, 221, 300, 301, 302, 303, 304, 315, 318, 319, 172, 291, 254 R, 295, 320; 83/35, 36, 442, 449, 466.1, 468.4, 468.6, 468.7, 743, 745

(56) References Cited

U.S. PATENT DOCUMENTS

| | | | | |
|---|---|---|---|---|
| 704,553 A | * | 7/1902 | Lindstrom ................... 269/142 |
| 787,724 A | * | 4/1905 | Campton et al. ........... 269/87.1 |
| 835,892 A | * | 11/1906 | Schipke ...................... 269/87.1 |
| 1,301,793 A | * | 4/1919 | Spery ............................ 228/39 |
| 1,578,898 A | * | 3/1926 | Littleford .................... 269/114 |
| 2,627,241 A | * | 2/1953 | Przyborowski ............. 269/121 |
| 4,096,777 A | * | 6/1978 | Adams .......................... 83/762 |
| 5,058,870 A | * | 10/1991 | Cetnar ......................... 269/118 |

* cited by examiner

Primary Examiner—Boyer Ashley
Assistant Examiner—Thomas J Druan
(74) Attorney, Agent, or Firm—Don Halgren

(57) ABSTRACT

The present invention involves an elongated frame assembly to permit the securing and proper angular cutting to length of a plurality of balusters which are utilized to support a handrail. The frame assembly comprises a pair of spaced-apart parallel side rails connected to a first and a second end rail and a separate support base arranged under each end rail to provide support the respective ends of balusters in the frame assembly. An adjustable slide member is arranged to permit the length of a plurality of balusters to be fixedly set according to a desired length to eliminate inaccuracies in cutting thereof.

7 Claims, 3 Drawing Sheets

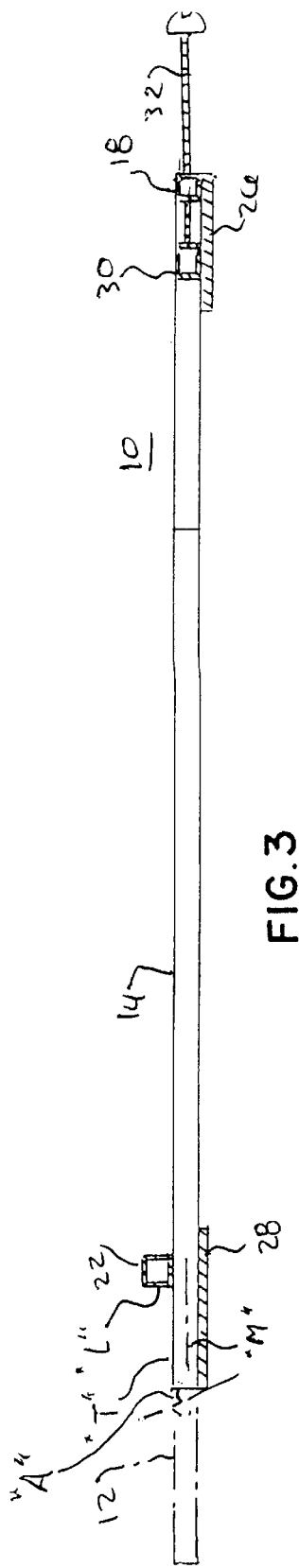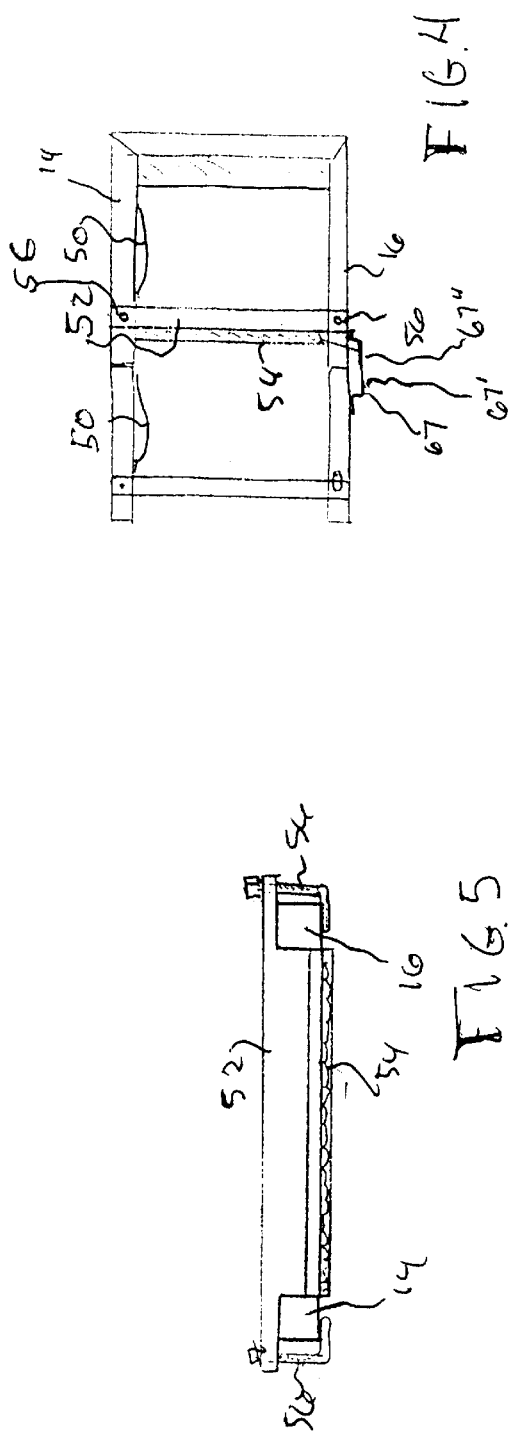

BALUSTER-CUTTER FRAME ARRANGEMENT

BACKGROUND OF THE INVENTION

1. Field of the Invention

This invention relates to wood securement and alignment arrangements, and more particularly to a frame arrangement for securing a plurality of balusters to permit them to be cut simultaneously at a common angle.

2. Prior Art

Balusters are the vertical poles which support a handrail going up a stairway. These balusters have an upper end and a lower end. The lower end may be cut perpendicular to its longitudinal axis, and its upper end is cut at an angle so as to permit the upper end to lie flush with the lower side of the handrail extending up the stairs. It is important to get all the balusters cut properly so they mate flush with the underside of the rail, or to look uniform with double cut exposed balusters.

Typically a carpenter cutting a baluster would use a power miter box to cut possibly maybe two balusters at the same time. This requires a long setup and typically something to support the wood being cut on a table, making this an inefficient operation. Cutting only a few (ie. typically only two) balusters at a time would increase the likelihood of cutting those ends of the balusters at the wrong angle on the subsequent cuts in addition to taking a far longer time than it should otherwise be done.

There are a number of arrangements in the art to facilitate cutting multiple elongated components at a common length or angle. Some of this prior art cutting guide arrangements may be seen in U.S. Pat. No. 2,023,911 to Boughton which shows a sweat-band cutting apparatus. This shows a somewhat complicated arrangement for aligning and securing sweat-bands prior to their being cut. U.S. Pat. No. 3,869,951 to Litwin shows a portable power saw guide for cutting a board squarely across its end. U.S. Pat. No. 5,927,172 to Wang shows a Venetian blind cutting machine wherein a hydraulic cylinder is used to compress a plurality of blinds and a cutting tool formed of multiple blades is arranged to cut a plurality of blinds simultaneously in a complicated and costly setup.

It is an object of the present invention to overcome the disadvantages of the prior art.

It is a further object of the present invention, to provide a baluster support arrangement, which will permit a large number of balusters to be cut one immediately after the other, safely and easily, in a common frame with a common angle thereon.

It is still a further object of the present invention, to provide a baluster support frame which frame itself is portable, collapsible, and readily usable without support tables, by a carpenter using a motorized power saw to readily cut the ends of the balusters accurately and efficiently.

BRIEF DESCRIPTION OF THE INVENTION

The present invention comprises an elongated frame for the cutting of a plurality of balusters in a sequential and accurate manner. The elongated frame is of rectilinear configuration. The frame assembly comprises a pair of parallel, spaced apart side rails, and a first transverse rail at a first end thereof. A second transverse rail is arranged a spaced distance from the edge of a second end of the elongated frame assembly. A first support base is arranged across the first end of the rail assembly and a second support base is arranged across a second end of the frame assembly. The uncut baluster material is arranged to be spaced and supported on the first and second base support members, each baluster typically being a two inch by two inch piece of wood. Successive pluralities of balusters may be cut at varying lengths according to the height of the rail on the stairway, deck, or porch. An adjustable block is arranged transversely across the first end of the frame assembly. The adjustable block permits the carpander to set the length of the balusters by aligning them between the elongated siderails of the frame assembly, having their first end resting upon the first base support of the frame assembly. The end of the balusters to be cut are disposed snugly between the second base support and the second transverse frame member. The uncut baluster members extend beyond the distal edge of the second end of the frame assembly. The balusters may be secured tightly together in the frame assembly by an arrangement of adjustable set screws extending through the first elongated side rail of the frame assembly.

In operation of the frame assembly of the present invention, the carpenter user of the invention places about eight or ten (or more) "two by two" inch members in parallel alignment between the parallel side rails, each baluster having its first end in abutting contact with the adjustable end rail. The adjustable end rail, may be preset to the proper distance from the end rail of the frame assembly according to markings on the elongated side rails, so as to provide a pre-adjustable abutment to the plurality of balusters being cut sequentially at their lower ends (and their upper ends after the balusters' reversal in the apparatus.

During the cutting operation, with the power saw having its blade set at the appropriate angle to be cut, the power saw is pushed across the top surface of the balusters being cut, with the butt plate of the power saw riding against the adjacent lateral side of the second transverse member of the elongated frame assembly. Thus, a plurality of baluster members are produced in a sequential cut at the proper angle and the proper piece at length.

In a further embodiment of the present invention, the elongated parallel spaced apart side rails are of a telescoping construction. A plurality of holes are arranged in a measured, spaced apart manner at a second portion of each elongated side rail, and a spring loaded button is arranged on the end of the engaging portions of those elongated side rails to permit the frame assembly to be foreshortened to accommodate shorter balusters, or to accommodate a more convenient carrying and storage arrangement for the frame assembly itself.

In a yet further preferred embodiment of the present invention, the adjustable thumb screws in the first elongated side rail are replaced with an elongated spring, which biases the collective alignment of balusters against the second elongated side rail of the frame assembly.

In a still further preferred embodiment of the present invention, an adjustable transverse rail is permitted to travel adjustably down the elongated first and second side rails of the frame assembly. This adjustable transverse rail acts as a slide stop having its own base support arranged therewith. Adjustable hold down fingers engage the first and second side rails of the adjustable slide stop to secure to any desired length for odd-size balusters.

Thus, what has been shown is a unique baluster frame assembly, which permits a carpenter to cut a far greater number of balusters in an accurate and properly aligned and convenient manner than is heretofore shown in the art. The frame assembly, moreover, is portable, collapsible and readily adjustable to accommodate different sizes of balusters to be produced or to accommodate different manufactures' saws being utilized.

The invention thus comprises an elongated frame assembly to permit the securing and proper angular cutting to length of a plurality of balusters which support a handrail, which assembly comprises: a pair of spaced apart parallel side rails connected to a first and a second end rail; a separate support base arranged under each end rail to provide support the respective ends of balusters in said frame assembly; an adjustable slide member to permit the length of a plurality of balusters to be fixedly set according to a desired length to eliminate inaccuracies in cutting thereof. The second of the end rails and its support base enclosingly receive the balusters therebetween for securement thereof. A biasing means may be arranged with respect to at least one of the side rails to squeezingly hold the balusters tightly between the side rails during cutting of their ends. The biasing means may comprise a plurality of adjustable set screws. The biasing means may comprise a spring arranged along an inner edge of at least one of the side rails. At least one of the side rails may have alignment markings thereon to permit the slide member to be properly pre-set to a desired length for the balusters. A third end rail may be slidably arranged between the first and second end rails to permit short balusters to be angularly cut on said frame assembly. The side rails may be telescopable so as to permit the frame assembly to be shortened and lengthened according to the particular baluster length necessary. Each of the side rails may include a plurality or engagement holes and a biased button for engagement with the holes to permit locking of the side rails at consistently accurately lengths for accuracy of the cutting operation. The invention also may include a method of accurately angularly cutting a plurality of balusters in a common cutting operation, and may comprise the steps of: arranging a pair of spaced apart parallel side rails connected to a first and a second end rail to define a frame assembly; placing a separate support base arranged under each end rail to provide support the respective ends of balusters in the frame assembly; moving an adjustable slide member at the first end of the frame assembly to permit the length of a plurality of balusters to be fixedly set according to a desired length to eliminate inaccuracies in cutting thereof; placing a plurality of balusters to be angularly cut on the support bases of the end rails so an end to be cut extends off of a second end of the frame assembly; and cutting the balusters at the second end of the frame assembly; biasing the balusters to be cut against on of the side rails to effect securement thereof in the frame assembly; arranging a third end rail between the side rails to permit the balusters to be supported between the first and the second end, rails and thereby be cut very short; adjusting the length of the side rails by telescopingly changing their length to permit the frame assembly to be easily carried; arranging a plurality of holes in the side rails and arranging a biased button in each of the side rails to permit the side rails to be lockable engaged into preset lengths for accuracy of consecutive cuts of successive plural balusters.

BRIEF DESCRIPTION OF THE DRAWINGS

The objects and advantages of the present invention will become more apparent, when viewed in conjunction with the following drawings in which:

FIG. 1A is an enlarged perspective view of a portion of an end of a side rail with a saw size-accommodation arrangement therein;

FIG. 3 is a view taken along the lines 3—3 of FIG. 2;

FIG. 4 is a plan view of the frame assembly showing the adjustable slide stop therewith; and FIG. 5 is a view taken along the lines 5—5 of FIG. 4, showing the further embodiment of the present invention showing an adjustable slide stop.

DESCRIPTION OF THE PREFERRED EMBODIMENTS

Figure 1:
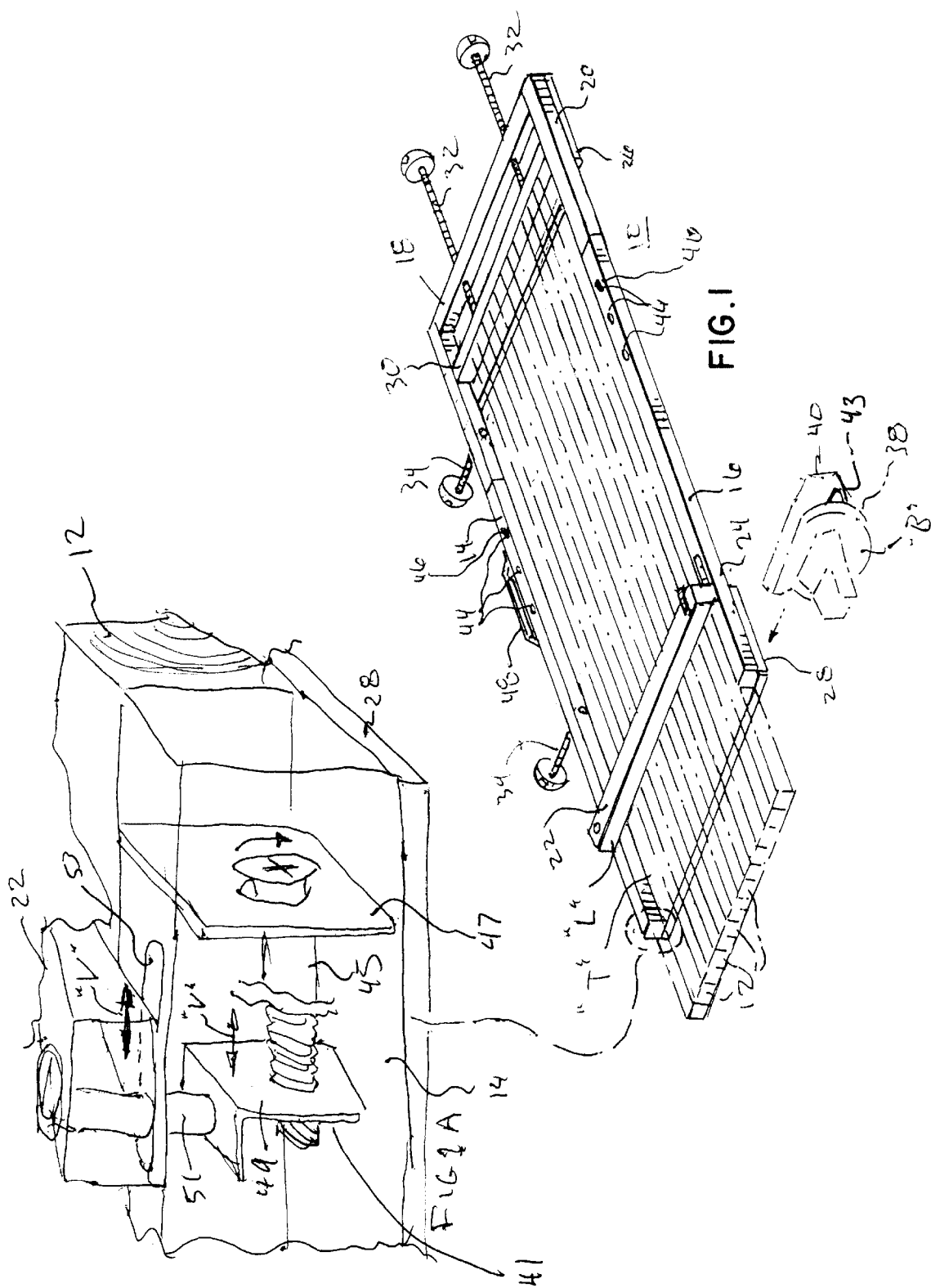
FIG. 1 is a perspective view of the baluster cutting frame assembly constructed according to the principles of the present invention.

Referring now to the drawings in detail, and particularly to FIG. 1, there is shown the present invention which comprises an elongated frame assembly 10 for the cutting of a plurality of balusters 12 in a sequential and accurate manner. The elongated frame assembly 10 is of rectilinear configuration. The frame assembly 10 comprises a pair of parallel, spaced apart side rails 14 and 16, and a first transverse rail 18 at a first end 20 thereof. A second transverse rail 22 is arranged a spaced distance from the edge of a second end 24 of the elongated frame assembly 10, as may be seen in FIGS. 1 and 2. A first support base 26 is arranged across the first end 20 of the frame assembly 10 and a second support base 28 is arranged across the second end 24 of the frame assembly 10. The uncut baluster material 12 is arranged to be spaced and supported on the first and second base support members 26 and 28, each baluster 12 typically being a two inch by two inch piece of wood. Successive pluralities of balusters 12 may be cut at varying lengths according to the height of the handrail which they support on the stairway, deck, or porch. An adjustable block 30 is arranged transversely across the first end 20 of the frame assembly 10, slidable between the first and second parallel rails 14 and 16. The adjustable block 30 permits the carpenter to set the length of the balusters 12 by aligning them between the elongated side rails 14 and 16 of the frame assembly 10, having their first end resting upon the first base support 26 of the frame assembly 10. The end of the balusters 12 to be cut are disposed snugly between the second base support 28 and the second transverse frame member 22. The uncut baluster members 12 extend beyond the distal edge of the second end 24 of the frame assembly 10. The balusters 12 may be secured tightly together in the frame assembly 10 by an arrangement of adjustable set screws 34 extending through the first elongated side rail 14 of the frame assembly 10.

In operation of the frame assembly 10 of the present invention, the carpenter user of the invention places about eight or ten two by two members 12 in parallel alignment between the parallel side rails 14 and 16, each baluster 12 having its first end in abutting contact with the adjustable end rail 30. The adjustable end rail 30, may be preset to the proper distance from the end rail 18 of the frame assembly 10 by a plurality of adjustment bolts 32 turned enough so as to move the adjustable end rail 30 a desired distance as indicated by the "length" markings 36 on the elongated side rails 14 and 16, so as to provide a pre-adjustable abutment to the plurality of balusters 12 being cut sequentially.

During the cutting operation, with the power saw 38 having its blade "B" set at the appropriate angle to be cut, the power saw 38 is pushed across the top surface "T" of the balusters 12 being cut, with the butt plate 40 of the power saw 38 riding against the adjacent lateral side "L" of the second transverse member 22 of the elongated frame assembly 10. Thus, a plurality of baluster members 12 are produced in a sequential cut at both the proper angle "A" with respect to the longitudinal axis "M" of the balusters 12, and at the proper at length. The second transverse rail 22 may be adjusted with respect to the ends of the side rails 14 and 16, by a transverse rail adjustment mechanism 41, as shown in FIG. 1A, to accommodate power saws with a different size base 43 dimension sliding across the top surfaces "T" of the balusters 12. The adjustment mechanism 41 includes an adjustment bolt 45 disposed through a stationary plate 47, the bolt 45 rotating through a holding plate 49 having a guide pin 51 extending through a slot 53 in each side rail 14 and 16 (only 14 shown). The pin 51 is fixedly attached to the second transverse rail 22 to move it towards and away from the ends of the side rails 14 and 16, as indicated by the arrows "V", as the bolt 45 is rotated.

Figure 2:
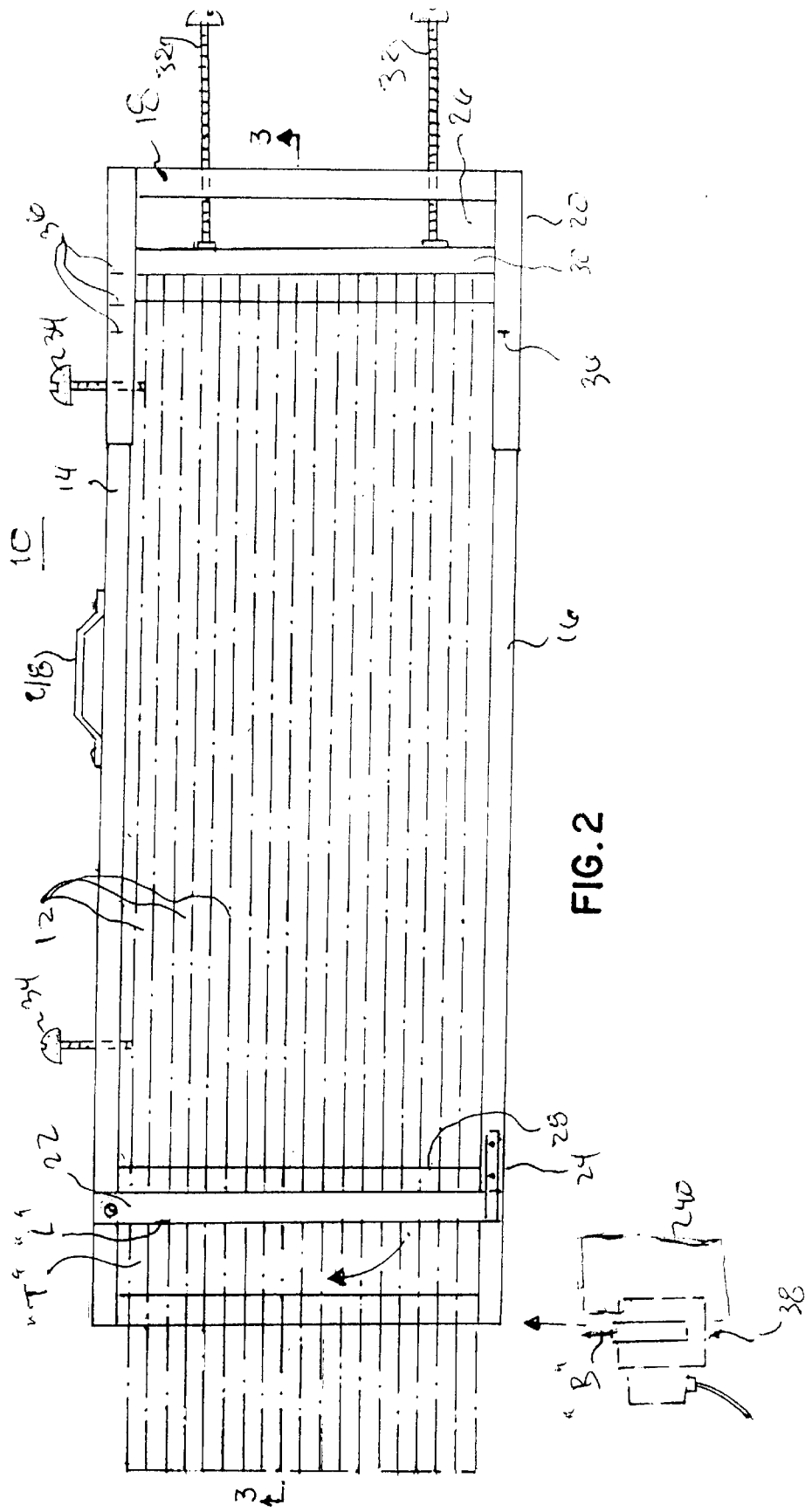
FIG. 2 is a plan view of the frame assembly shown in FIG. 1.

In a further embodiment of the present invention, the elongated parallel spaced apart side rails 14 and 16 are of a telescoping construction, as may be seen in FIGS. 1 and 2. A plurality of holes 44 are arranged in a measured, spaced apart manner at a second portion of each elongated side rail 14 and 16, and a spring loaded button 46 is arranged on the end of the engaging portions of those elongated side rails 14 and 16 to permit the frame assembly 10 to be foreshortened to accommodate shorter balusters, or to accommodate a more convenient carrying and storage arrangement for the frame assembly 10 itself. A handle 48 may be attached to permit ease of carrying.

In a yet further preferred embodiment of the present invention, the adjustable thumb screws 34 in the first elongated side rail 14 shown in FIG. 1, are replaced with a pair of elongated springs 50, as shown in FIG. 4. The springs 50 bias the collective alignment of balusters 12 against the second elongated side rail 16 of the frame assembly 10 to hold them tightly during the cutting operation. A split handle 67 may be arranged on an outside edge of either side rail 14 or 16, as shown in FIG. 4. The split handle 67 is arranged to straddle each side of the mating telescoping portions of one of the side rails 14 or 16, which split portions 67' and 67" are fully joined when the side rails are fully telescoped together In a still further preferred embodiment of the present invention, an adjustable third transverse rail 52 is permitted to travel adjustably down the elongated first and second side rails 14 and 16 of the frame assembly, as is shown in FIGS. 4 and 5. This adjustable transverse rail 52 acts as a slide stop having its own base support 54 arranged therewith to permit a plurality of balusters 12 to be properly cut angularly, even if their length is considerably shorter than the shortest telescoped length of the frame assembly 10. Adjustable hold down fingers 56 engage the first and second side rails 14 and 16 of the adjustable slide stop 52 to secure to any desired length for odd-size balusters 12. It is to be noted that the saw 38 may cut the balusters 12 from either direction depending upon the construction of that saw 38.

Thus, what has been shown is a unique baluster frame assembly, which permits a carpenter to cut a far greater number of balusters in an accurate and properly aligned and convenient manner than is heretofore shown in the art. The frame assembly, moreover, is portable, collapsible and readily adjustable to accommodate different sizes of balusters to be produced.

I claim:

1. An elongated frame assembly to permit the securing and proper angular cutting to length, of a plurality of balusters which are utilized to support a handrail, which frame assembly comprises:

a pair of spaced apart parallel side rails connected to a first and a second end rail;

a separate support base arranged under each end rail to support the respective ends of balusters in said frame assembly;

an adjustable slide member to permit the length of a plurality of balusters to be fixedly set according to a desired length to eliminate inaccuracies in cutting thereof, wherein said second of said end rails and its said support base enclosingly receive said balusters therebetween for securement thereof, and a biasing means is arranged with respect to at least one of said side rails to squeezingly hold said balusters tightly between said side rails during cutting of their ends.

2. The frame assembly as recited in claim 1, wherein said biasing means comprises a plurality of adjustable set screws.

3. The frame assembly as recited in claim 2, wherein each of said side rails include a plurality or engagement holes and a biased button for engagement with said holes to permit locking of said side rails at consistently accurately lengths for accuracy of the cutting operation.

4. The frame assembly as recited in claim 1, wherein at least one of said side rails has alignment markings thereon to permit said slide member to be properly pre-set to a desired length for said balusters.

5. The frame assembly as recited in claim 1, wherein said side rails are telescopable so as to permit said frame assembly to be shortened and lengthened according to the particular length necessary.

6. The frame assembly as recited in claim 1 wherein said second end rail is longitudinally adjustable with respect to said side rails to accommodate various heel butt plate dimensions of any power saw utilized with said frame assembly.

7. An elongated frame assembly to permit the securing and proper angular cutting to length of a plurality of balusters which support a handrail, which assembly comprises:

a pair of spaced apart parallel side rails connected to a first and a second end rail;

a separate support base arranged under each end rail to provide support the respective ends of balusters in said frame assembly;

an adjustable slide member to permit the length of a plurality of balusters to be fixedly set according to a desired length to eliminate inaccuracies in cutting thereof, wherein said second of said end rails and its said support base enclosingly receive said balusters therebetween for securement thereof; and including a biasing means arranged with respect to at least one of said side rails to squeezingly hold said balusters tightly between said side rails during cutting of their ends, said biasing means comprises a plurality of adjustable set screws, wherein at least one of said side rails has alignment markings thereon to permit said slide member to be properly pre-set to a desired length for said balusters, and wherein said adjustable slide member is slidably arranged between said first and second end rails to permit short balusters to be angularly cut on said frame assembly, said side rails being telescopable so as to permit said frame assembly to be shortened and lengthened according to the particular length necessary.

* * * * *